Figure 1:
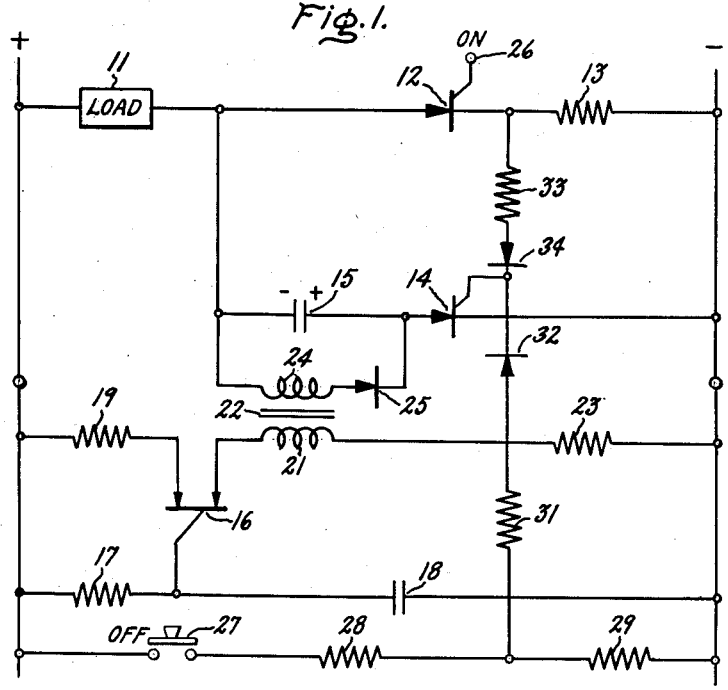

July 3, 1962. B. D. BEDFORD ETAL 3,042,838
DIRECT CURRENT STATIC ELECTRIC SWITCH
Filed Dec. 16, 1960

Inventors
Burnice D. Bedford
Leon J. Goldberg
by Charles W. Helzer
Their Attorney United States Patent Office 3,042,838
Patented July 3, 1962

3,042,838
DIRECT CURRENT STATIC ELECTRIC SWITCH
Burnice D. Bedford, Scotia, and Leon J. Goldberg, Schenectady, N.Y., assignors to General Electric Company, a corporation of New York
Filed Dec. 16, 1960, Ser. No. 76,246
4 Claims. (Cl. 317—52)

The present invention relates to a new and improved direct current static electric switch.

More particularly, the invention relates to a direct current static electric switch of the type that provides instantaneous current limiting protection simultaneously with closing of the switch.

In a copending United States application, Serial No. 30,484, Controlled Rectifier D.C. Switching Circuit, L. J. Goldberg, inventor, filed February 12, 1960, a static direct current electric switch is disclosed which provides instantaneous current limiting protection. This switch also includes as a feature thereof an arrangement for precharging the switch prior to closing so that in the event of closing the switch on a short circuit, the switch is capable of providing current limiting protection concurrently with the closing of the switch. The present invention is directed to an improved precharging network for use in a static direct current electric switch of the type described in the above identified copending application.

In practicing the invention a switching circuit is provided which includes a pair of silicon controlled rectifiers each having control gate elements. A first one of the controlled rectifiers is adapted to be connected in series circuit relationship with a load device across a source of direct current electric energy. A quenching or commutating capacitor is provided which is connected in series circuit relationship with the second controlled rectifier across the first mentioned controlled rectifier in order to divert load current from the first controlled rectifier. A precharging network is provided which comprises a source of oscillatory signals and a rectifying network operatively coupled in circuit relationship with the quenching capacitor for precharging the quenching capacitor with a potential having a polarity such that its negatively charged plate is connected to the positive electrode of the first controlled rectifier. And On triggering circuit is also coupled to the gate element of the first controlled rectifier for switching the switch to its On condition, and an Off triggering circuit is coupled to the gate element of the second controlled rectifier for turning on the second controlled rectifier and thereby turn the switch to its Off condition. In a preferred embodiment of the invention, an overload sensing device is connected to the switch in addition to the Off triggering circuit for turning off the switch instantaneously in response to an overload condition. This overload sensing device is comprised by a resistor connected in series circuit relationship with the load and the first controlled rectifier for sensing an overload current condition instantaneously, and electrically coupled to the control gate element of the second controlled rectifier for turning off the switch instantaneously in response to an overload condition.

Figure 2:
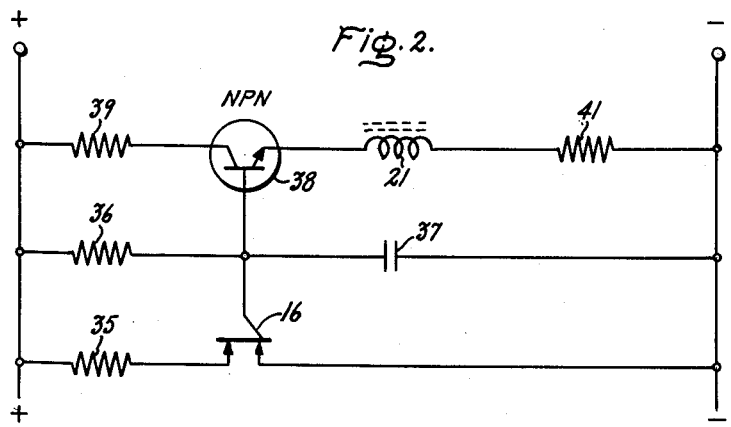

Other objects, features, and many of the attendant advantages of this invention will be appreciated more readily as the same becomes better understood by reference to the following detailed description when considered in connection with the accompanying drawings, wherein like parts in each of the several figures are identified by the same reference character, and wherein:

FIGURE 1 is a schematic circuit diagram of a preferred form of direct current static electric switch constructed in accordance with the teachings of the present invention; and FIGURE 2 is a schematic circuit diagram of an alternative embodiment of a direct current switch constructed in accordance with the invention.

The direct current static electric switch shown in FIGURE 1 of the drawings is comprised by a load device 11 connected in series circuit relationship with a silicon controlled rectifier 12 and an overload sensing resistor 13. This series circuit is connected across a source of direct current electric energy such as a 240 volt direct current supply with the polarities indicated in the drawings. The first silicon controlled rectifier 12 is bypassed by a second silicon controlled rectifier 14 which is connected in series circuit relationship with a capacitor 15. The series circuit thus formed is connected between the juncture of the load device 11 and the first controlled rectifier 12 and to the negative terminal of the direct current supply source.

The quenching or commutating capacitor 15 is adapted to be precharged by a charging network that comprises a source of oscillatory signals formed by a unijunction transistor 16 and a coupling transformer 22. The unijunction transistor 16 has its emitter electrode connected to the juncture of an R-C charging network formed by a series connected resistor 17 and capacitor 18 connected in series circuit relationship across the direct current supply source. One base electrode of the unijunction transistor 16 is connected through a resistor 19 to the positive terminal of the direct current supply source, and the remaining base electrode of transistor 16 is connected through the primary winding 21 of a coupling transformer 22 and through a biasing resistor 23 to the negative terminal of the direct current supply source. The unijunction transistor 16 in conjunction with the R-C charging network formed by resistor 17 and capacitor 18 will operate as a relaxation pulsed waveform generator to develop a pulsed waveform current that is coupled through the transformer 22. The alternating current potential appearing across secondary winding 24 is rectified by a diode rectifier 25 connected in series with the secondary winding 24 across the quenching capacitor 15 and results in precharging the capacitor 15 to some predetermined voltage higher than the voltage of direct current supply source. The predetermined voltage may be two, three, or four or more times higher than the supply voltage depending upon the turns ratio of the coupling transformer 22; however, it is preferred that this voltage be in the neighborhood of about twice the emitter-collector voltage of the first controlled rectifier 12.

In order to turn on the direct current static electric switch and thereby place it in operation, an On gating signal is supplied from a turn-on switch (not shown) that is connected to the control gate element 26 of the first controlled rectifier 12. For a detailed description of a suitable turn-on circuit adapted to be connected to the control gate element 26, reference is made to the above identified copending patent application. In order to turn off the static electric switch an Off triggering network is provided which is comprised by a manual pushbutton switch 27 connected in series circuit relationship with a pair of voltage dividing resistors 28 and 29 across the dierct current supply source. The juncture of the voltage dividing resistors 28 and 29 is connected through a current limiting resistor 31 and through a blocking diode 32 to the control gate element of the second silicon controlled rectifier 14. By this arrangement, upon the pushbutton switch 27 being depressed, a gating pulse will be supplied to the control gate element of the second silicon controlled rectifier 14 to turn off the switch in a manner to be described more fully hereinafter. Additionally, in order to provide protection against overcurrents, the overload sensing resistor 13 is coupled through a current limiting resistor 33 and through a blocking diode 34 to the control gate element of the second silicon controlled rectifier 14, and will function to turn On this controlled rectifier in order to turn the switch Off in the manner to be described hereinafter.

Upon placing the switch of FIGURE 1 in operation by connecting a direct current supply across the terminals marked positive and negative with the polarities indicated, the unijunction transistor 16 will function as a relaxation pulse generator to develop a pulsed current that is coupled through the transformer 22 to the rectifier 25. The oscillatory signal appearing across the secondary winding of coupling transformer 22 is rectified by the rectifier 25 and charges the capacitor 15 with the polarities indicated so that the plate of the quenching capacitor 15 that is connected to the positive electrode of the first controlled rectifier 12 will be charged negatively. The capacitor is charged to a predetermined potential about double that of the direct current supply source although this value is not critical and may even be less than the supply voltage. Thereafter, upon the gating On signal being supplied to the control gate element 26 of the first controlled rectifier 12, this rectifier will be turned on to allow load current to be supplied through the load 11 and overload sensing resistor 13. In the event of closing on a short circuit, or other defect wherein an overcurrent will exist concurrently with the gating On of the first controlled rectifier 12, such overcurrent will produce a triggering potential across the overload sensing resistor 13 that is coupled through the limiting resistor 33 and blocking diode 34 to the control gate element of the second controlled rectifier 14. This results in gating On the second controlled rectifier 14 so that the reverse potential appearing across the quenching capacitor 15 is in effect applied directly across the first controlled rectifier 12. This reverse potential will then function to turn off the controlled rectifier 12 by allowing it to regain its blocking condition. Accordingly it can be appreciated that the circuit will provide protection against instantaneous overload currents concurrently with the closing of the switch, and the providing of load current through a load device. This protection is provided without requiring an extraneous source of energy or an additional controlled rectifier but makes available a completely self-contained static unit capable of being energized from the same source of potential as that with which the switch is used.

It is desirable, and normally expected, that the switch will not have to be turned off in the above described manner to protect against instantaneous overload, and hence, the manual turn Off circuit is provided. Upon the turn Off switch 27 being depressed a gating signal pulse control will be supplied through the current limiting resistor 31 and blocking diode 32 to the element of the second silicon controlled rectifier 14 to turn on this controlled rectifier. The turning on of the second controlled rectifier 14 will then function to produce a reverse polarity potential across the first main load current carrying control rectifier 12 to allow it to regain its blocking condition and thereby turn off the switch, having turn Off by either the overload signal appearing across resistor 13 or by Off switch 27. The two blocking diodes 32 and 34 serve to isolate the two branches of the circuit to keep them from interfering with turning off of controlled rectifier 14. It is of course possible to modify the switch shown in FIGURE 1 further by the provision of an inverse time protective feature, such as that illustrated and described in the above mentioned co-pending application.

An alternative arrangement for producing a source of oscillatory signals for use in the switch of FIGURE 1, is shown in FIGURE 2 of the drawings. The source of oscillatory signals shown in FIGURE 2 is comprised by a unijunction transistor 16 having one of its base electrodes connected through a resistor 35 to the positive terminal of a source of direct current, and its remaining base electrode connected directly to the negative terminal of the direct current supply. The emitter electrode of the unijunction transistor 16 is connected to the junction of an R-C charging network comprised by a resistor 36 and a capacitor 37 connected across the terminals of the direct current source of supply. The emitter of the unijunction transistor 16 is also coupled directly to the base electrode of an NPN junction transistor 38 which has its collector electrode connected through a biasing resistor 39 to the positive terminal of the direct current source of supply. The emitter electrode of transistor 38 is connected through the primary winding 21 of coupling transformer 22 and the biasing resistor 41 to the negative terminal of the direct current supply. It is intended that the remainder of the switching circuit of FIGURE 1 be identical in construction and operation to the switching circuit shown in FIGURE 1 of the drawings, and hence, further details have not been illustrated in FIGURE 2. The circuit shown in FIGURE 2 is intended to be substituted for that portion of the circuit of FIGURE 1 leading up to and including the primary winding 21 of the coupling transformer 22. The circuit arrangement of FIGURE 2 has the additional advantage over the FIGURE 1 circuit of providing an amplification stage formed by the NPN junction transistor 38 intermediate the unijunction transistor relaxation pulse generator 16, 36, 37 and the coupling transformer 21. Hence, it is assured that the oscillatory signal coupled to the diode rectifier 25 will be of sufficient amplitude to charge the quenching capacitor 15 of the switching circuit to a value sufficient to achieve quenching or commutation of the switching circuit upon being actuated. In all other respects, the circuit arrangement of FIGURE 2 operates identically to that of FIGURE 1.

From the foregoing description, it can be appreciated that the invention provides a new and improved precharging network for use in a static direct current electric switch of the type which is capable of providing current limiting protection against short circuits and other defects concurrently with the closing of the switch.

Having described one embodiment of a new and improved direct current static electric switch constructed in accordance with the invention, it is believed obvious that other modifications and variations of the invention are possible in the light of the above teachings. It is therefore to be understood that changes may be made in the particular embodiment of the invention described which are within the full intended scope of the invention as defined by the appended claims.

What we claim as new and desire to secure by Letters patent of the United States is:

1. A switching circuit including in combination a pair of controlled rectifiers each having control gate elements, a first one of said controlled rectifiers being adapted to be connected in series circuit relationship with a load device across a source of electric energy, a quenching circuit including a quenching capacitor connected in series circuit relationship with said remaining controlled rectifier and adapted to divert load current from said first controlled rectifier, a charging device comprising a source of oscillatory current and a rectifying network operatively coupled in circuit relationship with said quenching capacitor for precharging said quenching capacitor with a potential having a polarity such that its negatively charged plate is connected to the positive electrode of said first mentioned controlled rectifier, an On triggering circuit coupled to the gate element of the first controlled rectifier for switching the circuit to its On condition, an Off triggering circuit coupled to the gate element of the remaining controlled rectifier for turning on said remaining controlled rectifier and thereby switch the circuit to its Off condition, and an overload sensing device connected in series circuit relationship with the load device for sensing an overload condition instantaneously, said overload sensing device being electrically coupled to the control gate element of said remaining controlled rectifier for turning off the circuit instantaneously in response to an overload condition.

2. The combination set forth in claim 1 wherein said charging device comprises a direct current to alternating current converter, a transformer having its primary winding operatively coupled to said converter, and a rectifier connected to the secondary winding of said transformer with the circuit thus formed being connected across the quenching capacitor for precharging the capacitor with a potential having a polarity such that its negatively charged plate is connected to the positive electrode of the first mentioned controlled rectifier.

3. The combination set forth in claim 1 wherein said charging device comprises a direct current to alternating current converter formed by a unijunction transistor pulse generator, a transformer having its primary winding operatively coupled to said unijunction transistor pulse generator, and a rectifier connected to the secondary winding of said transformer with the circuit thus formed being connected across the quenching capacitor for precharging the capacitor with a potential having a polarity such that its negatively charged plate is connected to the positive electrode of the first mentioned controlled rectifier.

4. A switching circuit including in combination a pair of controlled rectifiers each having control gate elements, a first one of said controlled rectifiers being adapted to be connected in series circuit relationship with a load device across a source of electric energy, a quenching circuit including a quenching capacitor connected in series circuit relationship with said remaining controlled rectifier and adapted to divert load current from said first controlled rectifier, a charging device comprising a source of oscillatory current and a rectifying network operatively coupled in circuit relationship with said quenching capacitor for precharging said quenching capacitor with a potential having a polarity such that its negatively charged plate is connected to the positive electrode of said first mentioned controlled rectifier, an On triggering circuit coupled to the gate element of the first controlled rectifier for switching the circuit to its On condition, and an Off triggering circuit coupled to the gate element of the remaining controlled rectifier for turning on said remaining controlled rectifier and thereby switch the circuit to its Off condition.

References Cited in the file of this patent

"Notes on the application of the Silicon Controlled Rectifier, G.E. Bulletin ECG-371; December 1958; page 53, FIGURE 10.2.

Applications and Circuit Design Notes, Solid State Products, Inc., Bulletin D 420-02; December 1959; page 19, FIGURE 29.